US012759272B2

(12) United States Patent
Saniei et al.

(10) Patent No.: US 12,759,272 B2
(45) Date of Patent: Oct. 13, 2026

(54) SYNTHETIC FOAMED CONTAINER THAT DOES NOT WICK AND A METHOD OF MAKING THE SAME

(71) Applicant: MuCell Extrusion, LLC, Woburn, MA (US)

(72) Inventors: Mehdi Saniei, Belmont, MA (US); Mark E. Lindenfelzer, Milton, MA (US); David Stirling, Croydon (GB); John F. Ryan, Tewksbury, MA (US)

(73) Assignee: MuCell Extrusion, LLC, Woburn, MA (US)

( * ) Notice: Subject to any disclaimer, the term of this patent is extended or adjusted under 35 U.S.C. 154(b) by 0 days.

(21) Appl. No.: 18/401,974

(22) Filed: Jan. 2, 2024

(65) Prior Publication Data

US 2024/0131825 A1 Apr. 25, 2024

Related U.S. Application Data

(63) Continuation of application No. 17/484,146, filed on Sep. 24, 2021, now Pat. No. 11,969,973.

(60) Provisional application No. 63/083,606, filed on Sep. 25, 2020.

(51) Int. Cl.

| | |
|---|---|
| ***B32B 27/32*** | (2006.01) |
| ***B32B 5/18*** | (2006.01) |
| ***B32B 27/06*** | (2006.01) |
| ***B32B 27/36*** | (2006.01) |
| ***B32B 37/15*** | (2006.01) |

(52) U.S. Cl.

CPC .............. *B32B 27/065* (2013.01); *B32B 5/18* (2013.01); *B32B 27/32* (2013.01); *B32B 27/36* (2013.01); *B32B 37/153* (2013.01); *B32B 2250/24* (2013.01); *B32B 2266/025* (2013.01); *B32B 2266/08* (2013.01); *B32B 2266/104* (2016.11); *B32B 2305/022* (2013.01); *B32B 2305/70* (2013.01); *B32B 2307/7244* (2013.01); *B32B 2307/7246* (2013.01); *B32B 2439/70* (2013.01)

(58) Field of Classification Search

CPC ..... B29C 48/0012; B29C 48/08; B29C 48/10; B29C 48/21; B32B 2250/24; B32B 2250/40; B32B 2266/02; B32B 2266/0221; B32B 2266/0235; B32B 2266/025; B32B 2266/0264; B32B 2266/08; B32B 2266/104; B32B 2272/00; B32B 2305/022; B32B 2305/70; B32B 2307/542; B32B 2307/718; B32B 2307/72; B32B 2307/7242; B32B 2307/7244; B32B 2307/7246; B32B 2307/7265; B32B 2307/734; B32B 2439/62; B32B 2439/70; B32B 27/065; B32B 27/08; B32B 27/304; B32B 27/306; B32B 27/32; B32B 27/36; B32B 29/002; B32B 3/28; B32B 37/153; B32B 5/18; B32B 5/32

See application file for complete search history.

(56) References Cited

U.S. PATENT DOCUMENTS

| | | | |
|---|---|---|---|
| 1,883,390 | A | 10/1932 | Meier |
| 7,182,985 | B1 | 2/2007 | Ghisolfi |
| 11,376,823 | B2 | 7/2022 | Saniei et al. |
| 2008/0003906 | A1 | 1/2008 | Hill et al. |
| 2020/0156293 | A1 | 5/2020 | Saniei et al. |
| 2020/0171786 | A1 | 6/2020 | Saniei et al. |
| 2020/0361184 | A1 | 11/2020 | Saniei et al. |
| 2021/0101372 | A1 | 4/2021 | Saniei et al. |
| 2021/0339923 | A1 | 11/2021 | Saniei et al. |
| 2022/0152995 | A1 | 5/2022 | Saniei et al. |
| 2022/0242088 | A1 | 8/2022 | Saniei et al. |

FOREIGN PATENT DOCUMENTS

| | | | |
|---|---|---|---|
| CA | 888674 | A | 12/1971 |
| DE | 19544858 | A1 | 4/1997 |
| EP | 0640461 | A1 | 3/1995 |
| JP | H02-175141 | A | 7/1990 |
| JP | 2002-530244 | A | 9/2002 |
| JP | 2019-514800 | A | 6/2019 |
| WO | WO 2005/068177 | A1 | 7/2005 |
| WO | WO 2020/236592 | A1 | 11/2020 |

(Continued)

OTHER PUBLICATIONS

International Search Report and Written Opinion for International Application No. PCT/US2021/051921 dated Dec. 27, 2021.

(Continued)

*Primary Examiner* — Lawrence D Ferguson

(74) *Attorney, Agent, or Firm* — Renner, Kenner; Arthur M. Reginelli

(57) ABSTRACT

A recyclable multilayer synthetic foam container that does not wick, for direct and non-direct food contact and aseptic packaging application is disclosed. In one aspect, a container comprises a pre-creased and/or folded multilayer synthetic foam sheet comprising at least one foam layer, that can be hermetically sealed along the edges, wherein the synthetic board sheet is a recyclable material that does not wick. In another aspect, the product has a bending stiffness value greater than 17 in Taber stiffness unit configuration according to TAPPI/ANSI T 489 om-15. In some embodiments, the product can have an oxygen transmission rate of less than 20 $cc/m^2/24$ hr, according to ASTM D3985. In some embodiments, the product can have a water vapor transmission rate of less than 10 $gr/m^2/24$ hr, according to ASTM E398-13.

23 Claims, No Drawings

(56) References Cited

FOREIGN PATENT DOCUMENTS

| | | | |
|---|---|---|---|
| WO | WO 2020/236604 | A1 | 11/2020 |
| WO | WO 2021/211968 | A1 | 10/2021 |

OTHER PUBLICATIONS

International Preliminary Report on Patentability (Chapter 1) for International Application No. PCT/US2021/051921 dated Apr. 6, 2023.

Extended European Search Report dated Sep. 11, 2024, in connection with Application No. 21873502.5.

SYNTHETIC FOAMED CONTAINER THAT DOES NOT WICK AND A METHOD OF MAKING THE SAME

RELATED APPLICATION

This application is a continuation of U.S. patent application Ser. No. 17/484,146, filed Sep. 24, 2021, which claims priority to U.S. Provisional Patent Application No. 63/083,606 filed on Sep. 25, 2020, each of which is incorporated herein by reference in its entirety.

FIELD

This invention relates to a multilayer synthetic foam container that does not wick, which may be used in the packaging of a flow-able product.

BACKGROUND

In the food packaging industry, flowable food products such as milk, soup, broth, juices are often packed in conventional container, e.g., paper-foil-plastic laminated carton or box, made of multilayer laminated material comprising a fiber-based layer, e.g., a paper board covered with plastic layers on both sides. These packaging materials usually comprise a barrier layer such as aluminum, EVOH, or nylon. Without a non-wicking treatment and hermetically sealing, moisture or oil to which the fiber-based layer is exposed near a splice, cutting edges, opening, through a seam, or through any existing defect in the outer or inner layer could be drawn into the fiber-based layer resulting in wicking, potential spoilage, and damaging the package integrity. Traditionally, the wicking issue from the inside of the aforesaid products is being prevented by the inclusion of an additional lamination sealing strip (LS Strip) along the exposed cutting edges before sealing. On the other hand, there has been no solution for the wicking issue when the boxes or cartons are exposed to any moisture from the outside. For example, when the juice or milk packages are placed inside the cooler adjacent to the ice where the moisture can penetrates into the paper-based layer along the all cutting edges which can result in images to the integrity of the package. Moreover, the oxygen barrier property of the aforesaid product, e.g., paper-plastic laminated products declines in a high relative humidity environment, for example, in warehouses where these boxes are stored. With the vast demand growth in food packaging in emerging markets, it would be desirable to produce lightweight recyclable polymeric container, e.g., boxes and cartons that does not wick and possesses bending stiffness values comparable to the paperboards used in packaging, and sufficient barrier properties, all of which may be essential attributes for a product to replace the kinds of container made of paperboards, multilayer laminated paperboard, wax-coated paperboards, paper-foil-plastic laminated paperboards, or paper-plastic laminated paperboard currently being used in packaging industries. In addition, it is desirable if the oxygen barrier property of the container does not deteriorate in an environment with an elevated relative humidity, for example 50% or higher.

SUMMARY

A recyclable lightweight multilayer synthetic container, e.g., box or carton, that does not wick, which may be used for the packaging of flowable materials, and aseptic and non-aseptic packaging application is described herein.

In one aspect, a recyclable lightweight multilayer synthetic container article that does not wick is provided. The article comprises a pre-creased and/or folded multilayer sheet comprising at least one foam layer and including hermetically sealed edges. The sheet comprises a recyclable material and does not wick. The ratio of the mass per unit area (the mass of a unit area of the sheet in gram per meter-squared ($gr/m^2$)) over the stiffness value in Taber unit configuration is equal to or less than 13.

In another aspect, a process of making a recyclable lightweight multilayer synthetic container article that does not wick is provided. The process comprises making a pre-creased synthetic multilayer sheet by co-extruding of at least one foam layer including a plurality of cells, wherein at least 10% of the cells are closed cells, and two solid skin layers, and one or more solid layers, wherein the foam layer is co-extruded between the skin layer and the one or more solid layers, and the ratio of the mass per unit area (the mass of a unit area of the film in gram per meter-squared ($gr/m^2$)) over the stiffness value in Taber unit configuration is equal to or less than 13; and creasing the said synthetic multilayer foam sheet. The method further comprises hermetically sealing edges of the article, and/or hermetically sealing a spout or a dispenser into/onto the article.

In some embodiments, at least one layer of the multilayer sheet comprises EVOH.

In some embodiments, the mass concentration of the EVOH in every unit area of the article is less than 10 percent of the mass of the unit area of the same article.

In some embodiments, the article has an oxygen transmission rate of less than 20 $cc/m^2/24$ hr, according to ASTM D3985.

In some embodiments, the article has an oxygen transmission rate of less than 20 $cc/m^2/24$ hr at an elevated relative humidity of 50%, according to ASTM F1927.

In some embodiments, the article has an oxygen transmission rate of less than 20 $cc/m^2/24$ hr at an elevated relative humidity of 75%, according to ASTM F1927.

In some embodiments, the article water vapor transmission rate of less than 10 $gr/m^2/24$ hr, according to ASTM E398-13.

In some embodiments, at least 10% of the cells in the foam layer are closed cells.

In some embodiments, the density of the foam layer is about 0.1 to 1 $gr/cm^3$.

In some embodiments, the foam layer has a cell density from $10^2$ to $10^9$ $cells/cm^3$ with respect to the un-foamed layer.

In some embodiments, the foam layer has an average cell size of 10 to 500 microns.

In some embodiments, at least one layer comprises up to 100% recycled materials.

In some embodiments, an innermost layer of the article comprises an FDA approved material for direct food contact applications.

In some embodiments, the sheet further comprises solid layers.

In some embodiments, the foam layer and solid layers comprise HDPE.

In some embodiments, the foam layer and solid layers comprise PP.

In some embodiments, the foam layer and solid layers comprise PET.

In some embodiments, the foam layer and solid layers comprise PLA or PHA.

In some embodiments, the foam layer and solid layers comprise polyolefins.

In some embodiments, a pre-creased roll of the synthetic foam sheet is processed in continuously.

In some embodiments, the process of making and filling the container is done aseptically.

In some embodiments, the process involves a post stream sterilization known as retort.

DETAILED DESCRIPTION

The singular forms "a," "an," and "the" include plural referents unless the context clearly dictates otherwise.

As used herein, the term "lightweight" refers to the bulk density value of the products described herein being less than, or equal to, the density of their solid counterpart made from the associated base virgin resin, or the density of the associated base virgin resin. In a similar context, it refers to the bulk density value of the products described herein being less than, or at least equal to, the density of the paperboards with the same thickness or with the same weight values per unit area in $gr/m^2$.

As used herein, the terms "wick" and "wicking" are given their ordinary meanings in the art and refer to the absorption or adsorption of any liquid (e.g., water or oil) into any layer of a product (e.g., a container). The liquid may penetrate into the layer, e.g., by capillary action. Wicking may create a weak spot in the layer which may result in failure of the product (e.g., container). Wicking may also lead to potential spoilage of any food or beverage that may be contained in the product. Wicking may be detected by one of ordinary skill in the art upon visual inspection of the product.

As used herein, the term "creasing" refers to the process that causes the area of the paper to be weakened so it facilitates the process of folding without causing fold cracking.

Broadly, an embodiment of the present disclosure provides a recyclable multilayer lightweight synthetic foam container, e.g., box, cartoon that does not wick, suitable for packaging of pourable or flowable products, including flowable edible products in the aseptic and non-aseptic packaging industry.

Some examples and applications of the product described in this disclosure are, but not limited to, packaging of all sorts of oxygen-sensitive products, packaging of pasteurized products; packaging of liquid food and beverages such as broths, soups, juice drinks, milk, and all sorts of products derived from milk, concentrates, all kinds of dressing, liquid eggs, tomato products; packaging of all sorts of alcoholic and non-alcoholic beverages, for example various types of wines; and packaging of all kinds of laundry detergents, shampoos, and body washes, all sorts of flowable solid product, e.g., laundry powder, sugar, salt, flour, nuts, crackers, etc.

The abovementioned examples do not put any limitation on the application of the products of this disclosure, and other applications may be possible.

The goal behind the production of the synthetic foam packages described herein and material selection for the replacement of paper-foil-plastic laminated containers is to address the recyclability and wicking issues.

In one embodiment, a container, e.g., box or carton, comprises a crease able/foldable multilayer synthetic foam sheet that can be hermetically sealed along the edges, wherein the synthetic board sheet is a #1 recyclable material that does not wick.

In one embodiment, a container, e.g., box or carton, comprises a crease able/foldable multilayer synthetic foam sheet that can be hermetically sealed along the edges, wherein the synthetic board sheet is a #2 recyclable material that does not wick.

In one embodiment, a container, e.g., box or carton, comprises a crease able/foldable multilayer synthetic foam sheet that can be hermetically sealed along the edges, wherein the synthetic board sheet is a #4 recyclable material that does not wick.

In one embodiment, a container, e.g., box or carton, comprises a crease able/foldable multilayer synthetic foam sheet that can be hermetically sealed along the edges, wherein the synthetic board sheet is a #5 recyclable material that does not wick.

In one embodiment, a container, e.g., box or carton, comprises a crease able/foldable multilayer synthetic foam sheet that can be hermetically sealed along the edges, wherein the synthetic board sheet comprises PLA, PHA, PET, or PBT that does not wick.

In some embodiment, a container, e.g., box or carton, comprises a crease able/foldable multilayer synthetic foam sheet that can be hermetically sealed along the edges, wherein the synthetic board sheet does not wick.

In some embodiments, the containers, e.g., boxes or cartons, described herein may be used in the packaging of any product where non-wicking and recyclability are desired.

In some embodiments, the containers described herein may be replaced the kind of paperboard or cardboard boxes with a plastic bag inside wherein the bag can be eliminated from the package.

Herein a recyclable multilayer synthetic foam container, e.g., a box or carton is disclosed which, in some embodiments, comprises no less than two layers, e.g., five layers, to be a replacement for paper-foil-plastic laminated containers and paper-plastic laminated containers that are being used in packaging industries, e.g., for aseptic and non-aseptic packaging applications, and for direct and non-direct food contact packaging application. The product comprises either polyethylene (PE), polypropylene (PP), polyethylene terephthalate (PET), or polylactic acid (PLA) wherein at least one layer has a cellular structure. In some embodiments, at least 10% of the cells are closed-cell; in some embodiments, more than 50% of the cells are closed cells; in some embodiments, more than 75% of the cells are closed cells; in some embodiments, more than 99% of the cells are closed cells; and in some embodiment, 100% of the cells are closed cells. As used herein, a "closed cell" refers to a cell that has cell walls that surround entirely the cell with no openings such that there is no interconnectivity to an adjacent cell.

In some embodiments, the multilayer synthetic foam sheet described herein comprises at least one foam layer with a density of about 0.1 to 1 $gr/m^3$. In some embodiments, the multilayer synthetic foam sheet described herein comprises at least one foam layer with a density of about 0.2 to 1 $gr/m^3$. In some embodiments, the multilayer synthetic foam sheet described herein comprises at least one foam layer with a density of about 0.3 to 1 $gr/m^3$. In some embodiments, the multilayer synthetic foam sheet described herein comprises at least one foam layer with a density of about 0.4 to 1 $gr/m^3$. In some embodiments, the multilayer synthetic foam sheet described herein comprises at least one foam layer with a density of about 0.5 to 1 $gr/m^3$. In some embodiments, the multilayer synthetic foam sheet described herein comprises at least one foam layer with a density of about 0.6 to 1 $gr/m^3$. In some embodiments, the multilayer synthetic foam sheet described herein comprises at least one foam layer with a density of about 0.7 to 1 $gr/m^3$. In some embodiments, the multilayer synthetic foam sheet described herein comprises at least one foam layer with a density of about 0.8 to 1 $gr/m^3$. In some embodiments, the multilayer synthetic foam sheet described herein comprises at least one foam layer with a density of about 0.9 to 1 $gr/m^3$.

In some embodiments, the multilayer synthetic foam sheet described herein comprises a foam layer with a cell density in the order of $10^2$ to $10^9$ cells/$cm^3$ with respect to the non-foamed layer. In some embodiments, the multilayer synthetic foam sheet described herein comprises a foam layer with a cell density in the order of $10^3$ to $10^9$ cells/$cm^3$ with respect to the non-foamed layer. In some embodiments, the multilayer synthetic foam sheet described herein comprises a foam layer with a cell density in the order of $10^4$ to $10^9$ cells/$cm^3$ with respect to the non-foamed layer. In some embodiments, the multilayer synthetic foam sheet described herein comprises a foam layer with a cell density in the order of $10^5$ to $10^9$ cells/$cm^3$ with respect to the non-foamed layer. In some embodiments, the multilayer synthetic foam sheet described herein comprises a foam layer with a cell density in the order of $10^6$ to $10^9$ cells/$cm^3$ with respect to the non-foamed layer. In some embodiments, the multilayer synthetic foam sheet described herein comprises a foam layer with a cell density in the order of $10^7$ to $10^9$ cells/$cm^3$ with respect to the non-foamed layer. In some embodiments, the multilayer synthetic foam sheet described herein comprises a foam layer with a cell density in the order of $10^8$ to $10^9$ cells/$cm^3$ with respect to the non-foamed layer.

In some embodiments, the multilayer synthetic foam sheet described herein comprises a foam layer with an average cell size of about 1 μm to 500 μm. In some embodiments, the multilayer synthetic foam sheet described herein comprises a foam layer with an average cell size of about 10 μm to 400 μm. In some embodiments, the multilayer synthetic foam sheet described herein comprises a foam layer with an average cell size of about 20 μm to 300 μm. In some embodiments, the multilayer synthetic foam sheet described herein comprises a foam layer with an average cell size of about 30 μm to 250 μm. In some embodiments, the multilayer synthetic foam sheet described herein comprises a foam layer with an average cell size of about 40 μm to 200 μm. In some embodiments, the multilayer synthetic foam sheet described herein comprises a foam layer with an average cell size of about 50 μm to 150 μm. In some embodiments, the multilayer synthetic foam sheet described herein comprises a foam layer with an average cell size of about 60 μm to 100 μm.

In some embodiments, at least one layer, for example, the foam layer or one of the solid layers, of the synthetic foam sheet described herein comprises up to 100% recycled materials. In some embodiments, at least one layer, for example, the foam layer, of the synthetic foam sheet described herein comprises up to 75% recycled materials. In some embodiments, at least one layer, for example, the foam layer, of the synthetic foam sheet described herein comprises up to 50% recycled materials. In some embodiments, at least one layer, for example, the foam layer, of the synthetic foam sheet described herein comprises up to 35% recycled materials. In some embodiments, at least one layer, for example, the foam layer, of the synthetic foam sheet described herein comprises up to 30% recycled materials. In some embodiments, at least one layer, for example, the foam layer, of the synthetic foam sheet described herein comprises up to 25% recycled materials. In some embodiments, at least one layer, for example, the foam layer, of the synthetic foam sheet described herein comprises up to 20% recycled materials. In some embodiments, at least one layer, for example, the foam layer, of the synthetic foam sheet described herein comprises up to 15% recycled materials.

In some embodiments, an innermost surface of the described container, e.g., box or carton, comprises an FDA-approved layer for direct food contact application, comprising an FDA-approved resin, for example, PE, PP, or PET. In some embodiments, an inside surface of the described container, e.g., box or carton, comprises an FDA-approved layer for direct food contact application wherein the thickness of the layer is less than 10 microns, in some cases, less than 8 microns, in some cases, less than 6 microns, in some cases, less than 4 microns, and in some cases, less than 2 microns. In some embodiments, at least one layer of the synthetic foam sheet described herein comprises an FDA-approved material for direct food contact application.

In some embodiments, the product described here comprises at least one solid layer containing EVOH, each of which is located somewhere between the foam layer and solid layer, or between two of the solid layers.

In some embodiments, the mass concentration of the EVOH in every unit area of the product described here is less than 10 percent of the mass of the unit area of the same product. In some embodiments, the mass concentration of the EVOH in every unit area of the multilayer product described here is less than 7.5 percent of the mass of the unit area of the same product. In some embodiments, the mass concentration of the EVOH in every unit area of the multilayer product described here is less than 5 percent of the mass of the unit area of the same product. In some other embodiments, the mass concentration of the EVOH in every unit area of the multilayer product describe here is less than 2 percent of the mass of the unit area of the same product.

In some embodiments, all layers of the described multilayer products comprise HDPE and, in some cases, the polymeric material in one or more of these layers consists essentially of HDPE and, in some cases, the polymeric materials in at least one of the solid layers, excluding the solid skin layers, comprises EVOH. In one embodiment, at least one layer of the multilayer film can comprise LDPE.

In some embodiments, all (or at least multiple) layers of the described multilayer products comprise PE and, in some cases, the polymeric material in one or more of these layers consists essentially of PE and, in some cases, the polymeric materials in at least one of the solid layers, excluding the solid skin layers, comprises EVOH.

In some embodiments, all (or at least multiple) layers of the described multilayer products comprise PP and, in some cases, the polymeric material in one or more of these layers consists essentially of PP and, in some cases, the polymeric materials in at least one of the solid layers, excluding the solid skin layers, comprises EVOH.

In some embodiments, all (or at least multiple) layers of the described multilayer products comprise PET and, in some cases, the polymeric material in one or more of these layers consists essentially of PET and, in some cases, the polymeric materials in at least one of the solid layers, excluding the solid skin layers, comprises EVOH.

In some embodiments, all (or at least multiple) layers of the described multilayer products comprise PLA and, in some cases, the polymeric material in one or more of these layers consists essentially of PLA and, in some cases, the polymeric materials in at least one of the solid layers, excluding the solid skin layers, comprises EVOH.

In some embodiments, the multilayer product described herein comprises nine layers; in some embodiments, seven layers; in some embodiments, six layers; in some embodiments, five layers; in some embodiments, four layers and, in some embodiments, three layers. For example, a five-layer product may comprise a foam core layer (e.g., comprising HDPE) and at least two solid layers (e.g., comprising HDPE), each one on respective opposite sides of the core layer, and at least one solid layer (e.g., comprising EVOH), each one between the foam layer and solid skin layer. In one embodiment, the five-layer product may comprise a solid core layer (e.g., comprising EVOH) and at least two solid layers (e.g., comprising HDPE), each one on respective opposite sides of the core layer, and at least two foam layers (e.g., comprising HDPE), each one between the foam layer and solid skin layer.

In one case, a seven-layer foam product comprises a foam core layer (e.g., comprising HDPE) in the middle with two solid skin layers (e.g., comprising HDPE) on each opposite side of the core layer, and at least one solid layer (e.g., comprising EVOH), each one between the foam layer and solid skin layer. In another case, a seven-layer product comprises a solid core layer (e.g., comprising EVOH) in the middle with two solid skin layers (e.g., comprising HDPE) on each opposite side of the core layer, and at least one foam layer (e.g., comprising HDPE), each one between the solid core layer and the solid skin layer.

In another embodiment, a nine-layer product comprises a foam core layer (e.g., comprising HDPE) in the middle with two solid skin layers (e.g., comprising HDPE) on each opposite side of the core layer, and at least one solid layer (e.g., comprising EVOH), each one between the foam layer and solid skin layer. In another embodiment, a nine-layer product comprises a solid core layer (e.g., comprising EVOH) in the middle with two solid skin layers (e.g., comprising HDPE) on each opposite side of the core layer, and at least one foam layer (e.g., comprising HDPE), each one between the solid core layer and solid skin layer.

In another embodiment, the multilayer product, which can be three, five, seven, or nine layers, comprises at least one foam layer and two solid skin layers, and at least one solid layer (e.g., comprising EVOH). In another embodiment, the multilayer product, which can be three, five, seven, or nine layers, comprises at least one solid layer comprising EVOH, each of which is located between the foam layer and solid layer, or between the two solid layers.

In some embodiments, the multilayer product described herein comprises multiple layers, e.g., from 2 layers to 9 layers, comprising at least one foam layer and one or more solid layers containing EVOH. In some other embodiments, the multilayer product described herein comprises multiple layers, e.g., from 2 layers to 9 layers, comprising at least one solid layer containing EVOH. In some other embodiments, the multilayer product described herein comprises multiple layers, e.g., from 2 layers to 9 layers, comprising at least one foam.

It should be understood that other layer configurations may be possible.

In some embodiments, the polymer composition of each layer comprises some apt amounts of other additives, such as pigments, UV stabilizers, antioxidants, nucleating agents, or clarifying agents. For example, at least one layer of the product described herein comprises about 0.1% to 35% by weight nucleating agent, in some cases, about 1% to 35%, in some cases from about 2.5% to 35%, in some cases, from about 5% to 35%, in some cases, from about 7.5% to 35%, in some cases, from about 10% to 35%, in some cases, from about 12.5% to 35%, in some cases, from about 15% to 35%, in some cases, from about 17.5% to 35%, in some cases, from about 20% to 35%, in some cases, from about 22.5% to 35%, in some cases, from about 25% to 35%, in some cases, from about 27.5% to 35%, in some cases, from about 30% to 35%, and in some cases, from about 32.5% to 35%.

In some cases, the multilayer product described here comprises two solid skin layers wherein one of the skin layers contains an apt amount of black pigments, for example, less than 1 percent by weight, for example, less than 0.75% by weight, for example less than 0.5% by weight, for example, less than 0.25% by weight, and the other solid skin layer contains apt amounts of white pigments, for example, less than 1 percent by weight, for example, less than 0.75% by weight, for example less than 0.5% by weight, for example, less than 0.25% by weight. In some other embodiments, both solid skin layers comprise an apt amount of white pigments.

The described multilayer product has a bending stiffness value of greater than 17, in some cases greater than 20, and in some cases, greater than 25, all in Taber stiffness unit configuration, according to TAPPI/ANSI T 489 om-15. In some other embodiments, the ratio of the mass per unit area (the mass of a unit area of the film in gram per meter-squared ($gr/m^2$)) over the stiffness value in Taber unit configuration is equal to or less than 13; in some cases, less than 11, and, in some cases, less than 10. In an embodiment, the film can have a Taber bending stiffness value of less than 280, according to TAPPI/ANSI T 489 om-15.

In some embodiments, the product described herein has a bulk density of about 0.45 to 1 $gr/cm^3$; in some cases, about 0.5 to 0.962 $gr/cm^3$; in some cases, about 0.55 to 0.962 $gr/cm^3$; in some cases, about 0.6 to 0.962 $gr/cm^3$; in some cases, about 0.65 to 0.962 $gr/cm^3$; in some cases, about 0.7 to 0.962 $gr/cm^3$; in some cases, about 0.75 to 0.962 $gr/cm^3$; in some cases, about 0.8 to 0.962 $gr/cm^3$; in some cases, about 0.85 to 0.962 $gr/cm^3$; in some cases, about 0.9 to 0.962 $gr/cm^3$; and in some cases, about 0.95 to 0.962 $gr/cm^3$.

In some embodiments, the foam layer of the disclosed product has a far better cellular morphology compared to the known films. For example, the foam layers of the disclosed films can have uniformly distributed cells, for example, with a closed-cell morphology, an average cell size of about 10-250 μm, an average cell density with respect to the un-foamed polymer volume of about $10^2$-$10^9$ cells/$cm^3$, and an expansion ratio of the foamed layer from 1 to 9. In some cases, the foam layer has a substantially entirely closed-cell morphology (e.g., greater than 95% closed cells). in some cases the expansion ratio of the foam layer is about 1 to 8, in some cases, from about 1 to 7, in some cases, from about 1 to 6, in some cases, from about 1 to 5, in some cases, from about 1 to 4, in some cases, from about 1 to 3, and in some cases, from about 1 to 2.

In some embodiments, the described multilayer product comprises at least one layer containing the PE/EVOH blend. In some embodiments, the multilayer foam film described herein comprises at least one layer, excluding the solid skin layers, containing from about 30 to 50 percent by weight of EVOH, and less than 5 percent by weight maleic anhydride, e.g., 2 percent by weight. In some embodiments, the multilayer foam film described herein comprises at least one layer, excluding the solid skin layers, containing from about 40 to 50 percent by weight of EVOH, and less than 5 percent by weight maleic anhydride, e.g., 2 percent by weight. In some embodiments, the multilayer foam film described herein comprises at least one layer, excluding the solid skin layers, containing from about 45 to 49 percent by weight of EVOH, and less than 5 percent by weight maleic anhydride, e.g., 2 percent by weight. In some embodiments, the overall mass concentration of the EVOH in a unit area of the film does not exceed 5 percent of the mass of the unit area of the film.

Embodiments of the multilayer foamed products described herein can exhibit significantly higher moisture barrier properties compared to their solid counterparts with the same value of mass per unit area (in gram per meter squared). For example, the multilayer product described herein can have a water vapor transmission rate of less than 10 gr/m$^2$/day, according to ASTM E398-13. In some case, the water vapor transmission rate of the product is less than 5 gr/m$^2$/day. In some embodiments, the water vapor transmission rate of the product is less than 1 gr/m$^2$/day. In some embodiments, the water vapor transmission rate of the product is less than 0.5 gr/m$^2$/day. In some embodiments, the water vapor transmission rate of the product is less than 0.25 gr/m$^2$/day. In some embodiments, the water vapor transmission rate of the product is less than 0.15 gr/m$^2$/day.

Embodiments of the multilayer foamed film products described herein can exhibit an enhanced oxygen barrier property. In some embodiments, the described product can have an oxygen transmission rate of less than 20 cc/m$^2$/24 hr, according to ASTM D3985. In some cases, the described product can have an oxygen transmission rate of less than or 10 cc/m$^2$/24 hr, according to ASTM D3985. In some embodiments, the described product can have an oxygen transmission rate of less than 5 cc/m$^2$/24 hr, according to ASTM D3985. In some embodiments, the described product can have an oxygen transmission rate of less than 2 cc/m$^2$/24 hr, according to ASTM D3985. In some embodiments, the described product can have an oxygen transmission rate of less than 1 cc/m$^2$/24 hr, according to ASTM D3985.

Embodiments of the multilayer foamed film products described herein can exhibit an enhanced oxygen barrier property at an elevated relative humidity. In some embodiments, the described product can have an oxygen transmission rate of less than 20 cc/m$^2$/24 hr in an elevated relative humidity of 50%, according to ASTM F1927. In some cases, the described product can have an oxygen transmission rate of less than or 10 cc/m$^2$/24 hr in an elevated relative humidity of 50%, according to ASTM F1927. In some embodiments, the described product can have an oxygen transmission rate of less than 5 cc/m$^2$/24 hr in an elevated relative humidity of 50%, according to ASTM F1927. In some embodiments, the described product can have an oxygen transmission rate of less than 2 cc/m$^2$/24 hr in an elevated relative humidity of 50%, according to ASTM F1927. In some embodiments, the described product can have an oxygen transmission rate of less than 1 cc/m$^2$/24 hr in an elevated relative humidity of 50%, according to ASTM F1927.

In some embodiments, the described product can have an oxygen transmission rate of less than 20 cc/m$^2$/24 hr in an elevated relative humidity of 75%, according to ASTM F1927. In some cases, the described product can have an oxygen transmission rate of less than or 10 cc/m$^2$/24 hr in an elevated relative humidity of 75%, according to ASTM F1927. In some embodiments, the described product can have an oxygen transmission rate of less than 5 cc/m$^2$/24 hr in an elevated relative humidity of 75%, according to ASTM F1927. In some embodiments, the described product can have an oxygen transmission rate of less than 2 cc/m$^2$/24 hr in an elevated relative humidity of 75%, according to ASTM F1927. In some embodiments, the described product can have an oxygen transmission rate of less than 1 cc/m$^2$/24 hr in an elevated relative humidity of 75%, according to ASTM F1927.

In some embodiments, various thermoplastics can be used in at least one layer of the multilayer product such as polyethylene (PE), polypropylene (PP), polyethylene terephthalate (PET), ethylene-vinyl acetate (EVA), ethylene vinyl alcohol (EVOH), polyvinyl chloride (PVC), Polyvinylidene chloride (PVDC), polyamide (PA), LLDPE copolymer which includes an α-olefin co-monomer such as butene, hexene, or octene; polylactic acid (PLA), or polyhydroxyalkanoates (PHA).

In some embodiments, the product described herein can be entirely shredded or pulverized and used to make the same product described herein.

In some embodiments, suitable foam layers and methods of forming the same have been described, for example, in commonly-owned U.S. patent application Ser. No. 16/875,198, filed on May 15, 2020 and entitled "LIGHTWEIGHT POLYETHYLENE FILM FOR ASEPTIC PACKAGING APPLICATIONS AND THE PRODUCT RESULTING THEREFROM AND THE PROCESS OF MAKING THE SAME" and U.S. patent application Ser. No. 16/415,233, filed May 17, 2019, and entitled "LIGHTWEIGHT POLYETHYLENE FILM FOR FOOD PACKAGING APPLICATIONS AND THE PRODUCT RESULTING THEREFROM AND THE PROCESS OF MAKING THE SAME", both of which are incorporated herein by reference in their entireties.

In some embodiments, suitable foam layers and methods of forming the same have been described, for example, in commonly-owned U.S. Patent Application No. US62/911,820, filed on Oct. 7, 2019 and entitled "Lightweight multilayer foam film with enhanced perceived surface whiteness" which is incorporated here by its entirety.

In some embodiments, suitable foam layers and methods of forming the same have been described, for example, in commonly-owned U.S. patent application Ser. No. 16/193,043, filed on Nov. 15, 2019 and entitled "ANISOTROPIC THIN POLYETHYLENE SHEET AND APPLICATIONS THEREOF AND THE PROCESS OF MAKING THE SAME" which is incorporated herein by reference in its entireties.

In some embodiments, suitable foam layers and methods of forming the same have been described, for example, in commonly-owned U.S. provisional Patent Application No. US63/136,891, filed on January 2021 and entitled "Foamed sheet comprising recycled PET and the products resulting therefrom and the process of making the same" which is incorporated herein by reference in its entireties.

The product described herein may be manufactured by various methods and in various shapes, for example but not limited to, gable top cartons, and in various sizes, for example but not limited to, 200 ml, 500 ml, and 1 Litre. In some embodiments, the process of making a pre-creased synthetic multilayer foam sheet, comprising co-extruding of at least one foam layer including a plurality of cells, wherein at least 10% of the cells are closed cells, and two solid skin layers, e.g., comprising HDPE, e.g., comprising PP, e.g., comprising PET, e.g., comprising PLA, e.g., comprising polyolefins, and one or more solid layers, e.g, comprising ethylene vinyl alcohol (EVOH), wherein the said foam layer is being co-extruded between the skin layer and the one or more solid layers (e.g., comprising EVOH), and the ratio of the mass per unit area (the mass of a unit area of the film in gram per meter-squared (gr/m$^2$)) over the stiffness value in Taber unit configuration is equal to or less than 13; creasing the said synthetic multilayer foam sheet; then the pre-creased sheets with a specific dimension, according to the size of the container, are folded and hermetically sealed. In some embodiments, pre-creased and pre-folded sheets are vertically sealed into carton sleeves. In some embodiments, a pre-creased roll of the synthetic foam sheet can be used in a continuous fashion. In some embodiments, extra features such as, but not limited to, spouts or dispensers might be included and hermetically sealed onto/into the container, e.g., box or carton. In some embodiments, the process of making and filling the container can be done either aseptically or non-aseptically.

In some embodiments, the product described herein is being manufactured and filled continuously whereby the capacity of the packaging plants is determined essentially by the cycle time required for the manufacturing of the product described herein and the filling cycle time, and can get to at least 500 units per filling station per hour.

In some embodiments, the process of making and using the product described herein involves a post steam sterilization process known as retort during the packaging process. In some cases, the process of making and using the described products involves high pressure sterilization process (HPP) during the packaging process.

The invention claimed is:

1. A process of making a recyclable lightweight multilayer synthetic container article that does not wick, comprising:

making a pre-creased synthetic multilayer sheet by co-extruding of at least one foam layer including a plurality of cells, wherein at least 10% of the cells are closed cells, and two solid skin layers, and one or more solid layers, wherein the foam layer is co-extruded between the skin layer and the one or more solid layers, and the ratio of the mass per unit area (the mass of a unit area of the film in gram per meter-squared ($gr/m^2$)) over the stiffness value in Taber unit configuration is equal to or less than 13;

creasing the said synthetic multilayer foam sheet; and hermetically sealing edges of the article, and/or hermetically sealing a spout or a dispenser into/onto the article.

2. The process of claim 1, wherein at least one layer of the multilayer sheet comprises EVOH.

3. The process of claim 2, wherein a mass concentration of the EVOH in every unit area of the article is less than 10 percent of the mass of the unit area of the same article.

4. The process of claim 1, wherein the article has an oxygen transmission rate of less than 20 $cc/m^2/24$ hr, according to ASTM D3985.

5. The process of claim 1, wherein the article has an oxygen transmission rate of less than 20 $cc/m^2/24$ hr at an elevated relative humidity of 50%, according to ASTM F1927.

6. The process of claim 1, wherein the article has an oxygen transmission rate of less than 20 $cc/m^2/24$ hr at an elevated relative humidity of 75%, according to ASTM F1927.

7. The process of claim 1, wherein the article has a water vapor transmission rate of less than 10 $gr/m^2/24$ hr, according to ASTM E398-13.

8. The process of claim 1, wherein at least 10% of the cells in the foam layer are closed cells.

9. The process of claim 1, wherein the density of the foam layer is about 0.1 to 1 $gr/cm^3$.

10. The process of claim 1, wherein the foam layer has a cell density from $10^2$ to $10^9$ $cells/cm^3$.

11. The process of claim 1, wherein the foam layer has an average cell size of 10 to 500 μm.

12. The process of claim 1, wherein at least one layer of the article comprises up to 100% recycled materials.

13. The process of claim 1, wherein an innermost layer of the article comprises an FDA approved material for direct food contact applications.

14. The process of claim 1, wherein the foam layer and the one or more solid layers comprise HDPE.

15. The process of claim 1, wherein the foam layer and the one or more solid layers comprise PP.

16. The process of claim 1, wherein the foam layer and the one or more solid layers comprise PET.

17. The process of claim 1, wherein the foam layer and the one or more solid layers comprise PLA or PHA.

18. The process of claim 1, wherein the foam layer and the one or more solid layers comprise polyolefins.

19. The process of claim 1, wherein a pre-creased roll of the synthetic foam sheet is processed continuously.

20. The process of claim 1, wherein the process of making the recyclable lightweight multilayer synthetic container article is done aseptically.

21. The process of claim 1, wherein the process involves a post stream sterilization known as retort.

22. The process of claim 20, further comprising filling the recyclable lightweight multilayer synthetic container article.

23. The process of claim 22, wherein the filling is done aseptically.

* * * * *